Patented Jan. 6, 1925.

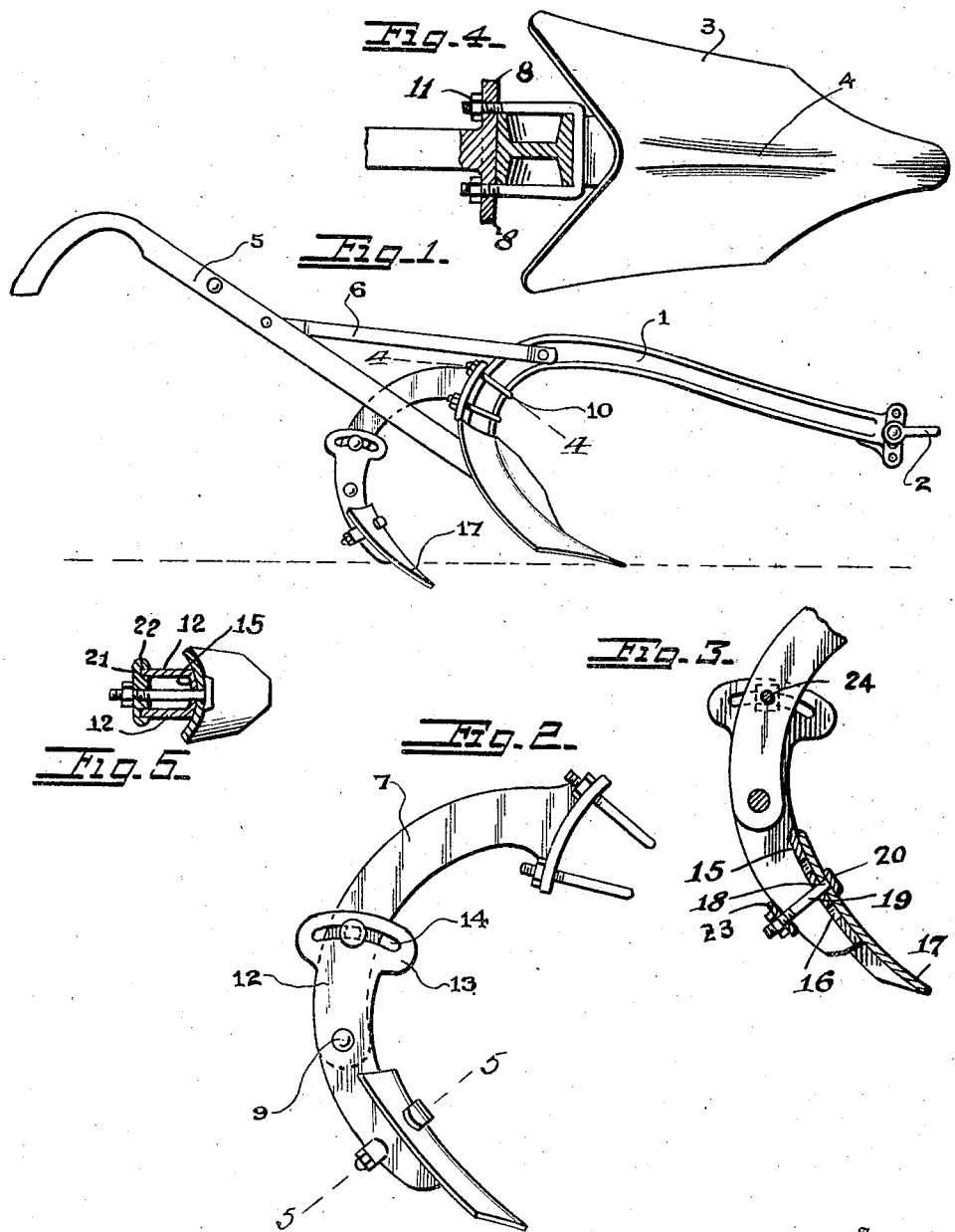

1,521,991

UNITED STATES PATENT OFFICE.

BENJAMIN OVID BIBB, JR., OF DREW, MISSISSIPPI.

PLOW ATTACHMENT.

Application filed August 12, 1922. Serial No. 581,305.

*To all whom it may concern:*

Be it known that I, BENJAMIN OVID BIBB, Jr., a citizen of the United States, residing at Drew, in the county of Sunflower and State of Mississippi, have invented new and useful Improvements in Plow Attachments, of which the following is a specification.

In carrying out the present invention it is my purpose to provide an attachment for plows of the type commonly called "middle burster" whereby the bottom of the furrow formed by the "middle burster" and often referred to as the "pan" will be broken up and softened, thereby eliminating the hard flat surface that is usually found at the bottom of a furrow when a "middle burster" is used instead of a turn plow.

It is also my purpose to provide an attachment of the class described which may be adjusted so as to penetrate the "pan" or bottom of the furrow to any desired depth, thereby breaking up the bottom of the furrow after the point of the plow has passed thereover.

Furthermore, I aim to provide an attachment of the class described which will embrace the desired features of simplicity, efficiency and durability, which may be manufactured and marketed at small cost and which may be readily attached to the present type of "middle burster" plow.

With the above recited objects in view, and others of a similar nature, the invention resides in the construction, combination and arrangement of parts set forth in and falling within the scope of the appended claim.

In the accompanying drawings:

Figure 1 is a view in side elevation of a "middle burster" plow equipped with an attachment constructed in accordance with my invention.

Figure 2 is a view in side elevation of the attachment removed from the plow.

Figure 3 is a vertical sectional view through the same, parts being shown in elevation.

Figure 4 is a sectional view on the line 4—4 of Figure 1.

Figure 5 is a sectional view on the line 5—5 of Figure 2.

Referring now to the drawings in detail, 1 designates a plow beam having its forward end equipped with a clevis 2 to which the draft animals or other motive power may be attached. The other end of the plow beam 1 is curved downwardly, as usual, and bolted or otherwise secured to the forward edge of the downwardly curved end of the beam 1 is a plow share 3 of the "middle burster" type. In accordance with my invention the center of the plow share 3 is provided with a cutting edge 4 which acts to reduce the load on the horse or other motive power used to pull the plow and to eliminate the accumulation of weeds and sticks in advance of the wings of the burster point. This cutting edge 4 is so formed that the abrupt corners are eliminated, as clearly illustrated in Figure 4 of the drawings.

Connected with the beam 1 and projecting rearwardly therefrom are the usual handles 5 that are reinforced by a brace bar 6 connecting the handles and the beam 1.

My improved attachment is shown as an entirety in Figure 2 of the drawings and is also shown in Figure 1 as attached to the beam 1, and this attachment comprises a curved arm 7, one end of which is formed with laterally extending flanges 8 that project in opposite directions from the sides of the arm 7. The other end of the arm 7 extends rearwardly and downwardly and is equipped with a transverse pivot bolt 9. Straddling the beam 1 immediately above the upper edge of the plow share 3 are U-shaped bolts 10, the ends of which pass through bolt holes formed in the flanges 8 and upon these ends are threaded nuts 11 by which the arm 7 may be securely and effectively attached to the beam 1 and held rigidly in attached position. Pivotally mounted upon the ends of the bolt 9 carried by the lower end of the arm 7 are segments 12—12 arranged upon opposite sides of the arm 7 and having their upper ends formed with relatively wide heads 13 in which curved slots 14 are formed. The forward edges of the segments 12 below the lower end of the arm 7 are connected together by a web 15 and formed in the web 15 are openings 16 spaced apart vertically.

17 designates the point for breaking the bottom or "pan" of the furrow. In the present instance this point 17 is formed with an opening 18 through which is passed a bolt 19. One end of the bolt 19 is formed with a cross piece 20 that extends across the face of the point 17, while the other end of the bolt 19 is passed through a plate 21 that engages the rear edges of the segments 12 and is formed with grooves 22 in which such edges are disposed. Threaded upon the rear end of the bolt 19 is a nut 23 by which the bolt may be tightened in order to secure the point 17 securely to the segments 12.

By means of the openings 16 and the bolt 19 the point 17 may be adjusted so as to penetrate the bottom of the "pan" of the furrow below the "middle burster" point 3 as shown in Figure 1 of the drawings, thereby enabling the "pan" to be broken up after the "middle burster" has passed thereover. Extending through the slots 14 in the heads 13 of the segments 12 and through the arm 7 is a bolt 24 equipped with a nut by means of which the segments, when swung about the pivot bolt 9 to the desired adjusted position, may be locked in such position.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

A plow attachment of the class described comprising a curved arm having laterally extending flanges projecting in opposite directions from the sides of said arm, means for attaching said arm to the plow beam, spaced parallel segments arranged upon opposite sides of said arm and pivotally connected thereto, a web connecting the forward edges of said segments and vertically spaced openings in said segment for adjustment of a point, said point being rigidly secured in adjusted position by means of a bolt passing through the openings in said point and segment.

In testimony whereof I affix my signature.

BENJAMIN OVID BIBB, Jr.